No. 876,042. PATENTED JAN. 7, 1908.
A. L. DARR.
TRANSFORMABLE PROTRACTOR, SQUARE, &c.
APPLICATION FILED OCT. 18, 1906.
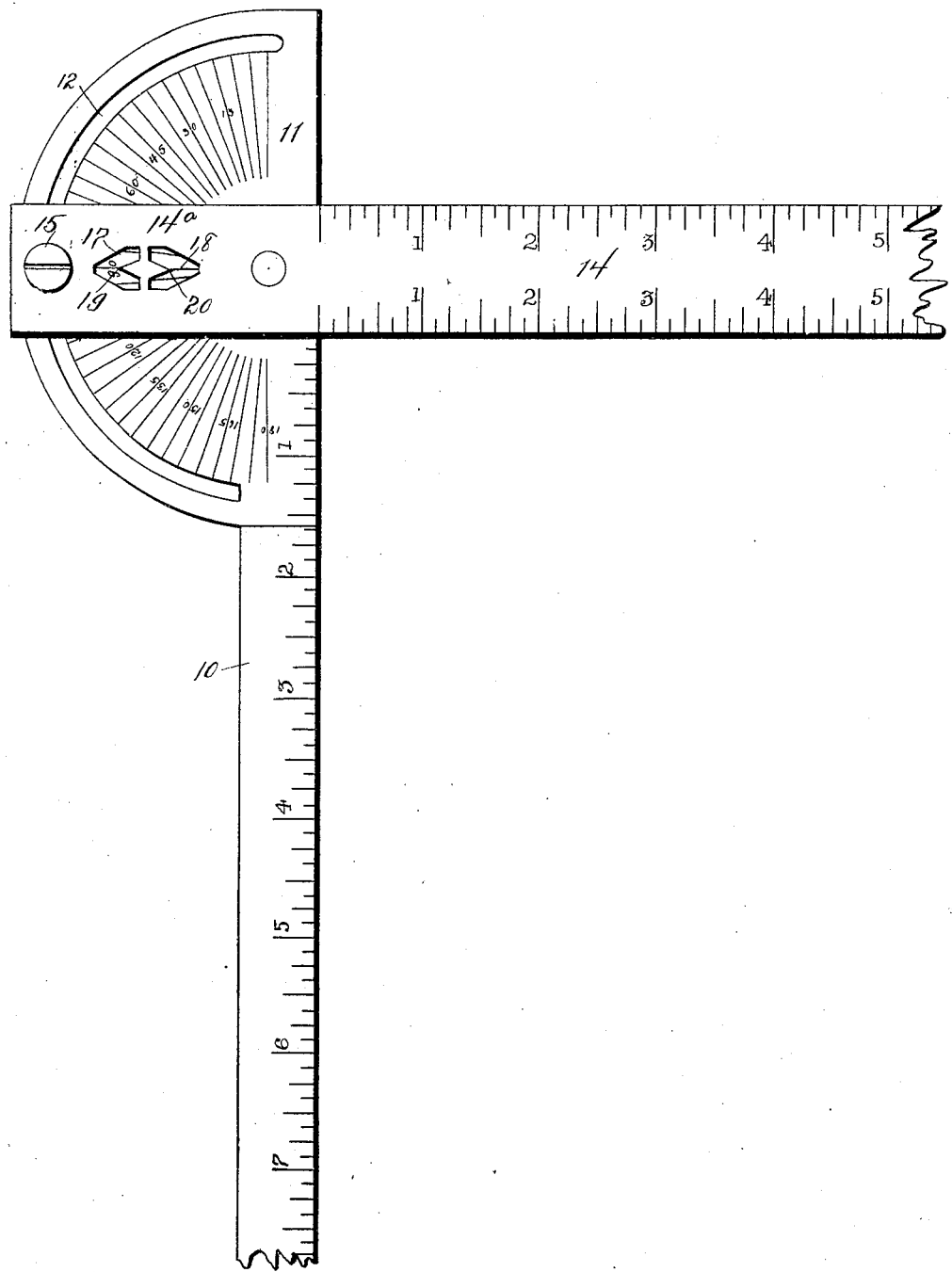

UNITED STATES PATENT OFFICE.

ABRAHAM L. DARR, OF CARROLL, IOWA.

TRANSFORMABLE PROTRACTOR, SQUARE, &c.

No. 876,042. Specification of Letters Patent. Patented Jan. 7, 1908.

Application filed October 18, 1906. Serial No. 339,876.

*To all whom it may concern:*

Be it known that I, ABRAHAM L. DARR, a citizen of the United States, residing at Carroll, in the county of Carroll and State of Iowa, have invented a new and useful Transformable Protractor, Square, &c., of which the following is a specification.

The object of this invention is to provide an improved adjustable tool adapted to be advantageously used alternately as a try-square, a T-square, a head-square, a miter-square and the like, and also used as a protractor.

My invention consists in the construction, arrangement and combination of two straight measures and a protractor as hereinafter set forth, pointed out in my claims and illustrated in the accompanying drawing, in which the drawing is a plan of the device and shows the two measures in right angled position relative to each other.

In the construction of the device as shown the numeral 10 designates a straight flat measure of uniform width and provided on its upper face with graduation marks indicating linear measurements. A protractor plate 11 is fixed to or formed on one end portion of the measure 10 and its straight bottom edge is in alinement with the edge of the straight measure. The upper face of said plate is flush with the upper face of said straight measure. A semicircular slot 12 is formed in the plate 11 contiguous to and concentric with the curved outer margin thereof. The upper face of the protractor plate 11 is inscribed with degree lines arranged radially in a manner common to protractors and designated at intervals to guide the user in ascertaining a given degree by indices from zero to 180° or such part thereof as may be desired. A second straight measure, 14, is pivoted on the plate 11 at the geometrical center of said plate and the head of the rivet countersunk. That portion of the measure 14 which projects laterally from the plate 11 is provided on its top face with graduation marks indicating linear measurements. A portion 14ª of the measure 14 extends across the plate 11 and a set screw 15 is mounted through the extremity thereof and through the slot 12 in the protractor plate 11 and is provided with a thumb-nut 16 on its lower end. It is the function of the set-screw 15 and thumb-nut 16 to set, fix and determine the relations of the two measures 10 and 14 and plate 11 at whatever degree or angle of inclination said measure may be positioned in respect of the protractor plate 11 as required in practical use.

By making the two overlying measures flat and pivoting the upper one to the protractor the upper measure can be advantageously placed flat on the lower measure and protractor.

Openings 17, 18, of approximately triangular form, are provided in the portion 14ª of the measure 14 and produce indices or index pointers 19, 20 arranged in alinement longitudinally of the measure 14. The openings 17, 18, reveal a portion of the inscribed surface of the protractor plate 11 and the index fingers or pointers aid the user in setting the measure 14 at the desired angle relative to the measure 10 because of the proximity of said pointers to the degree lines on the plate.

From the foregoing description the uses and operation of the device will be obvious.

I claim as my invention—

1. In a protractor and square combined, two straight measures, each having parallel edges, pivotally connected to produce a square and to fold flat on top of each other, a protractor extending laterally from the end of the under measure to serve as a part of the under measure and the upper straight measure extended across the top of the protractor, as set forth.

2. In a protractor and square comprising two straight measures, each having parallel edges, pivotally connected to produce a square and to fold flat on top of each other, a protractor extending laterally from the end of the under measure to serve as a part of the under measure and the upper straight measure extended across the top of the protractor and means for adjustably fastening the upper measure to the protractor as set forth.

ABRAHAM L. DARR.

Witnesses:
JAMES E. GRIFFITH,
JOHN SCHACHTNER, Jr.